(12) United States Patent
Marcus et al.

(10) Patent No.: US 7,965,890 B2
(45) Date of Patent: Jun. 21, 2011

(54) TARGET RECOGNITION SYSTEM AND METHOD

(75) Inventors: Eran Marcus, Culver City, CA (US); Nathaniel Wyckoff, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 984 days.

(21) Appl. No.: 11/650,013

(22) Filed: Jan. 5, 2007

(65) Prior Publication Data

US 2008/0166014 A1 Jul. 10, 2008

(51) Int. Cl.
*G06K 9/34* (2006.01)
*G06K 9/64* (2006.01)

(52) U.S. Cl. ........................ 382/173; 382/217
(58) Field of Classification Search .................. 382/103, 382/173, 209, 217, 218
See application file for complete search history.

(56) References Cited

U.S. PATENT DOCUMENTS

| | | | | |
|---|---|---|---|---|
| 5,926,568 A * | 7/1999 | Chaney et al. | ............... | 382/217 |
| 5,999,653 A | 12/1999 | Rucklidge et al. | | |
| 6,173,066 B1 * | 1/2001 | Peurach et al. | ............... | 382/103 |
| 6,263,088 B1 * | 7/2001 | Crabtree et al. | ............... | 382/103 |
| 6,956,569 B1 * | 10/2005 | Roy et al. | ...................... | 345/426 |
| 7,542,624 B1 * | 6/2009 | Koch | ............................ | 382/294 |

(Continued)

FOREIGN PATENT DOCUMENTS

WO WO99/23444 A 5/1999

(Continued)

OTHER PUBLICATIONS

Weese. "Shape Constrained Deformable Models for 3D Medical Image Segmentation." Proceedings of the 17th International Conference on Information Processing in Medical Imaging, vol. 2082, 2001, pp. 380-387.*

(Continued)

*Primary Examiner* — Jon Chang
(74) *Attorney, Agent, or Firm* — Christie, Parker & Hale, LLP

(57) ABSTRACT

A target recognition system and method. The inventive method includes the steps of first receiving an image of a scene within which a target may be included and second using constrained image segmentation as a basis for target recognition. In the specific embodiment, the segmentation is variable and derived from target geometry models. The constrained image segmentation is adapted to use target geometry models to derive alternative image segmentation hypotheses. The hypotheses are verified using a novel hierarchical adaptive region model matcher. In the best mode, the hierarchical adaptive region model matcher is fully hierarchical and includes the steps of receiving an image and a hypothesis with respect to a target in the image. In the illustrative embodiment, the hypothesis contains the type, location, and/or orientation of a hypothesized target in the image. The hypothesis is received by a model tree generator. A target model library provides a plurality of computer generated target models. The model tree generator retrieves a model from the library based on a hypothesized target type and renders a model tree therefrom that represents the appearance of a hypothesized target at a hypothesized location and orientation. In the illustrative embodiment, the verification model further includes a search manager adapted to receive a model tree from the model tree generator. A feature extractor is included along with a segmentation evaluator. The segmentation evaluator is coupled to receive image features from the feature extractor. The segmentation evaluator is adapted to output a segmentation score to the search manager with respect to a specified set of segmentation labels based on a supplied set of image features for an active node.

61 Claims, 10 Drawing Sheets

U.S. PATENT DOCUMENTS

2005/0123197 A1* 6/2005 Tank .............................. 382/173
2006/0193493 A1* 8/2006 Ruch .............................. 382/103

FOREIGN PATENT DOCUMENTS

WO    WO03025843 A    3/2003

OTHER PUBLICATIONS

Han. "Model-Based Object Recognition Using the Hausdorff Distance with Explicit Pairing." Proceedings, International Conference on Image Processing, vol. 4, Oct. 24, 1999, pp. 83-87.*

"Recognizing Vehicles in Infrared Images Using IMAP Parallel Vision Board", published by M. Kagesawa, S. Ueno, K. Ikeuchi, and H. Kashiwagi, in IEEE Transactions on Intelligent Transportation Systems 2(1):10-17, (2001).

S. Z. Der and R. Chellappa, "Probe-Based Automatic Target Recognition in Infrared Imagery", IEEE Transactions on Image Processing 6(1) :92-102, (1997).

William J. Rucklidge, "Locating Objects Using the Hausdorff Distance", iccv, p. 457, Fifth International Conference on Computer Vision (ICCV'95), 1995.

M. Shapiro, M. Blaschko, "Stability of Hausdorff-Based Distance Measures", Proceedings of IASTED Visualization, Imaging, and Image Processing, 2004.

Sun-Gu Sun; Dong-Min Kwak; Won Bum Jang; Do-Jong Kim, "Small Target Detection Using Center-Surround Difference with Locally Adaptive Threshold.", Proceedings of the 4th International Symposium on Image and Signal Processing and Analysis, pp. 402-407 (Sep. 15-17, 2005).

"A Knowledge-Based Approach to the Detection, Tracking and Classification of Target Formations in Infrared Image Sequences." Published by J..F. Bronskill, J. S. A Hepburn, W. K Au in the IEEE Computer Society Conference Proceedings on Computer Visionand Pattern Recognition, 4-8, pp. 153-158 (Jun. 1989).

Olson, C.F. and Huttenlocher, D.P. Automatic Target Recognition by Matching Oriented Edge Pixels;IEEE Transactions on Miage Processing,IEEE Service Center, Piscataway,vol. 6, No. 1, Jan. 1997 (pp. 103-113,XP000642455 NJ,US.

* cited by examiner

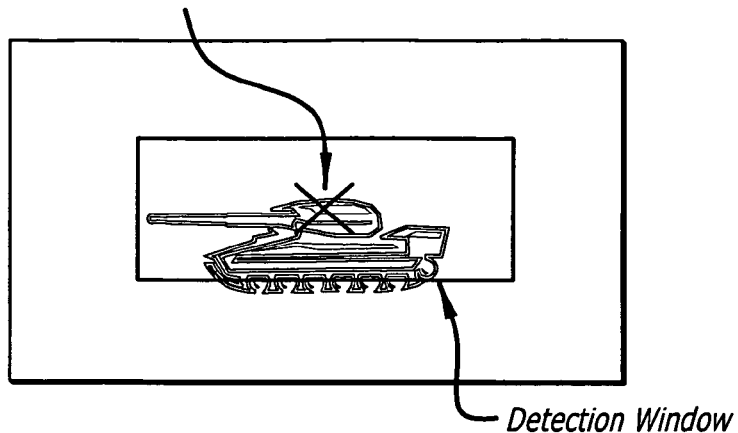
FIG. 7
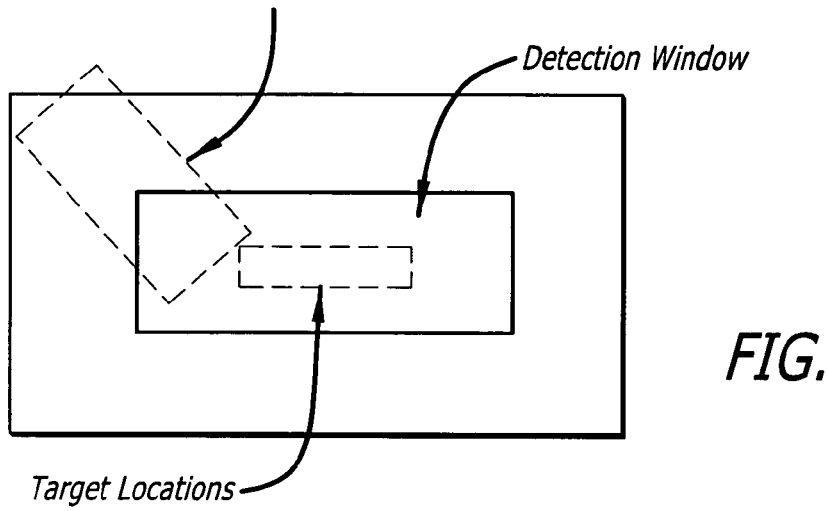
FIG. 8
FIG. 9
| a b a | * * * |
| b p * | * p b |
| * * * | a b a |
| A) | B) |

TARGET RECOGNITION SYSTEM AND METHOD

BACKGROUND OF THE INVENTION

1. Field of the Invention

The present invention relates to imaging systems. More specifically, the present invention relates to automatic target recognition and verification systems and methods.

2. Description of the Related Art

Imaging systems are currently used in a variety of military, industrial, commercial and consumer applications. Various technologies are available for providing image data including cameras operating in the visible portion of the spectrum, infrared sensors, and radar based systems.

For certain, e.g., military, applications, a large number of sensing systems are employed operating in various portions of the electromagnetic spectrum. These systems interrogate numerous sensors and generate substantial image data. Previously, the data was interpreted manually by a human operator or analyst. However, this approach is becoming impractical as the number of sensors and sensing systems increase and the output rate thereof climbs. Accordingly, for such demanding applications, an automatic data interpretation capability is needed.

Automatic target recognition (ATR) is one type of data interpretation system. Currently, ATR systems and methods fall into two broad classifications: statistical and model-based. Generally, statistical systems are trained to recognize targets based on empirical target data. While this approach can perform adequately under highly constrained conditions, it tends to be less than sufficiently robust with respect to signature variability. This leads to a requirement for a substantial amount of data and is therefore problematic for certain current and planned applications.

Model-based systems generally use synthetic predictions of target signatures to make recognition decisions. In this approach the system is provided with a model of a target and it predicts what the target might look like under various conditions and in various environments. Although this approach can display consistent performance across varying scene conditions, it is subject to limitations in current signature prediction technology.

In general, both approaches are limited by the fact that optical imagery is highly variable and inconsistent. Images derived from the same scene under the same conditions by the same sensor will vary considerably. This leads to challenges in automatic recognition that are exacerbated in military applications by targets that endeavor to avoid recognition.

Hence, a need remains in the art for an automatic target recognition system that is robust to signature variability and is not subject to current limitations in signature prediction technology.

SUMMARY OF THE INVENTION

The need in the art is addressed by the target recognition system and method of the present invention. The inventive method includes the steps of first receiving an image of a scene within which a target may be included and second using constrained image segmentation as a basis for target recognition.

In the specific embodiment, the segmentation is variable and derived from target geometry models. The constrained image segmentation is adapted to use target geometry models to derive alternative image segmentation hypotheses.

The hypotheses are verified using a novel hierarchical adaptive region model matcher. In the best mode, the hierarchical adaptive region model matcher is fully hierarchical and includes the steps of receiving an image and a hypothesis with respect to a target in the image. In the illustrative embodiment, the hypothesis contains type, location, and/or orientation of a hypothesized target in the image. The hypothesis, is received by a model tree generator. A target model library provides a plurality of computer generated target models. The model tree generator retrieves a model from the library based on a hypothesized target type and renders a model trees therefrom that represents the appearance of a hypothesized target at a hypothesized location and orientation.

In the illustrative embodiment, the verification module further includes a search manager adapted to receive a model tree from the model tree generator. A feature extractor is included along with a segmentation evaluator. The segmentation evaluator is coupled to receive image features from the feature extractor. The segmentation evaluator is adapted to output a segmentation score to the search manager with respect to a specified set of segmentation labels based on a supplied set of image features for an active node. In the best known mode, the evaluations are effected using a Minimum Description Length (MDL) process, but other objective functions for image segmentation may be used instead.

In the best mode, the inventive system includes an indexing module in which a Hausdorff Silhouette Matching process is used to generate target hypotheses.

The inventive method provides a framework for structure hierarchy exploitation that is independent of the features and objective functions employed at the image level and effects an application of advanced model-based vision techniques without dependence on specific phenomenological prediction capabilities.

BRIEF DESCRIPTION OF THE DRAWINGS

FIG. 1b is a block diagram of the target identification processor depicted in FIG. 1a.

FIG. 7 is a diagram: that illustrates the operation of the window extraction function of the Hausdorff algorithm used in the illustrative embodiment of the present invention.

FIG. 8 is a diagram that illustrates a transform sizing process for the Hausdorff Model Matching process of the illustrative embodiment.

FIGS. 9a and 9b are diagrams that illustrate a distance computation process for the implementation of the Hausdorff Model Matching process of the illustrative embodiment.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The automatic target recognition system of the present invention is a suite containing four major functional components or modules: Detection, Indexing, Verification, and Prediction. These components play distinct roles in an end-to-end process of interpreting target content in input imagery in accordance with the present teachings. Existing systems have primarily addressed each of these functions for LWIR (long-wavelength infrared) imagery. See for example: "Recognizing Vehicles in Infrared Images Using IMAP Parallel Vision Board", published by M. Kagesawa, S. Ueno, K. Ikeuchi, and H. Kashiwagi, in *IEEE Transactions on Intelligent Transportation Systems* 2(1):10-17, (2001); "Probe-Based Automatic Target Recognition in Infrared Imagery" published by S. Z. Der, and R, Chellappa, in *IEEE Transactions on Image Processing* 6(1):92-102, (1997); "A Knowledge-Based Approach to the Detection, Tracking and Classification of Target Formations in Infrared Image Sequences." Published by J. F. Bronskill, J. S. A Hepburn, W. K Au in the *IEEE Computer Society Conference Proceedings on Computer Vision and Pattern Recognition,* 4-8, page(s):153-158 (June 1989); and "Small Target Detection Using Center-Surround Difference with Locally Adaptive Threshold." Published by Sun-Gu Sun; Dong-Min Kwak; Won Bum Jang; Do-Jong Kim in the *Proceedings of the 4th International Symposium on Image and Signal Processing and Analysis*, page(s):402-407 (Sep. 15-17, 2005).

The present teachings extend this ATR functionality to the MWIR (middle-wavelength infrared), SWIR (short-wavelength infrared), and visible regions of the spectrum.

Figure 1A:
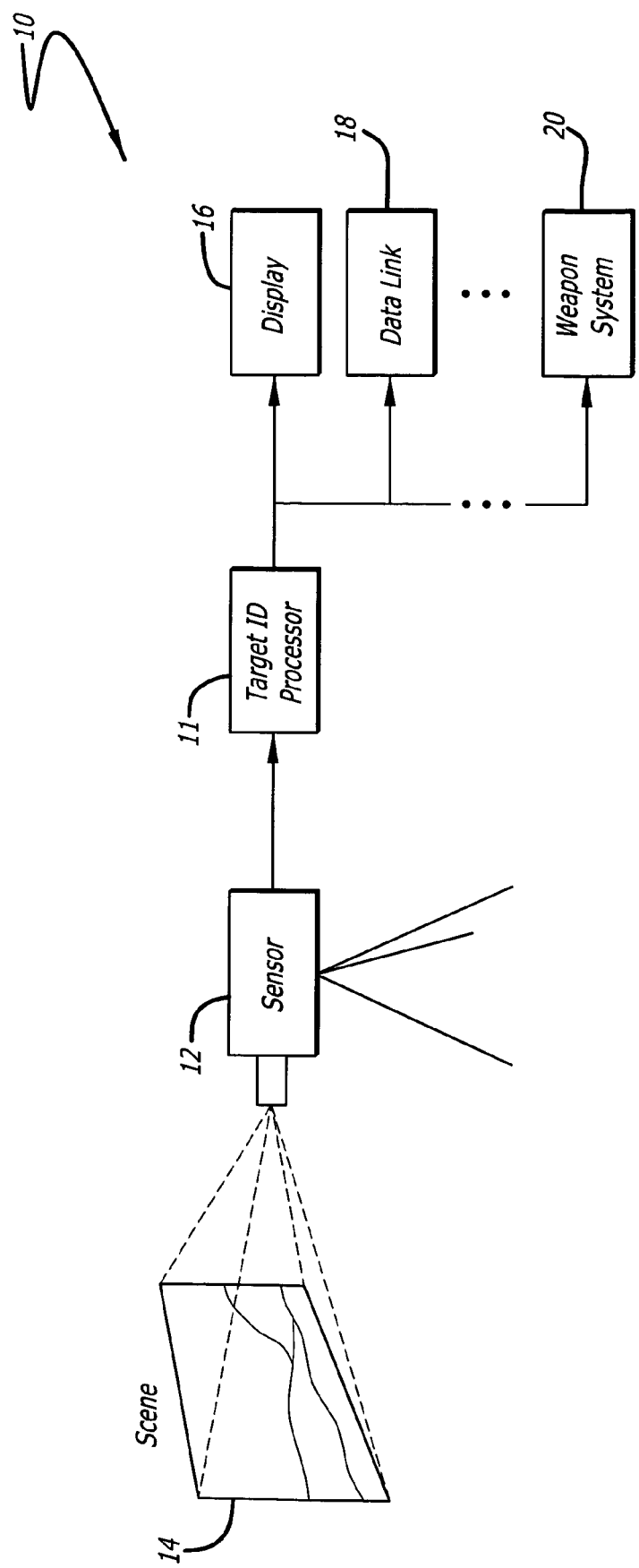
FIG. 1a is a block diagram showing functional components of an illustrative embodiment of an automatic target recognition system implemented in accordance with the teachings of the present invention.

FIG. 1a is a block diagram of an automatic target recognition system implemented in accordance with an illustrative embodiment of the teachings of the present invention. The system 10 includes a target identification processor 11 which receives input from a sensor 12 with respect to a scene depicted at 14. The target ID processor 11 outputs signals to a display 16, a data link 18 and/or weapon system 20.

Figure 1B:
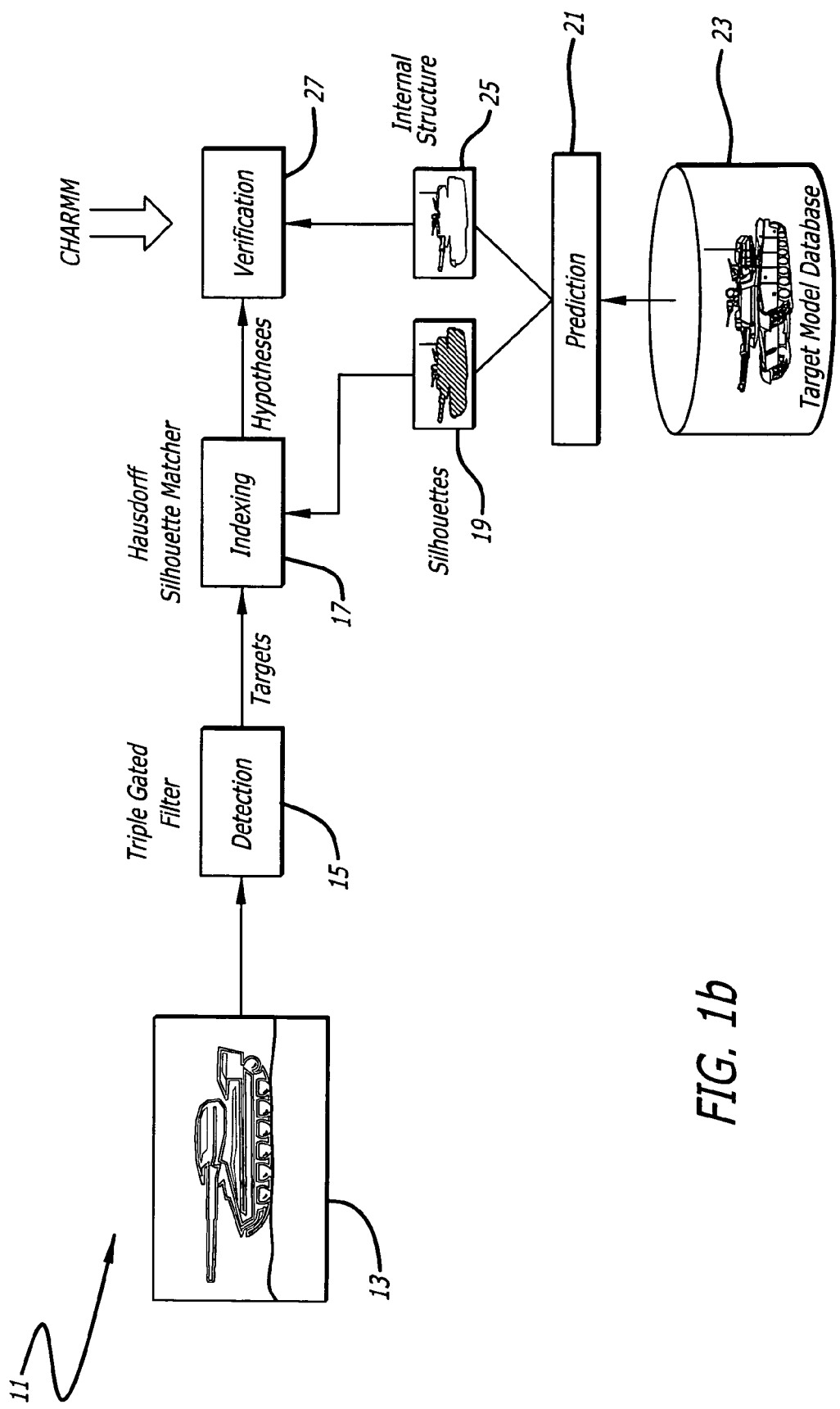

FIG. 1b is a block diagram of the target identification processor depicted in FIG. 1a. As disclosed more fully below, in accordance with the illustrative embodiment, the system 11 includes a detection module. 15, which receives an input image 13 from a sensor (e.g., camera) not shown and feeds an indexing module 17. In the best mode, indexing is effected using a Hausdorff Silhouette Matcher. The indexing module 17 receives a silhouette prediction 19 from a prediction module 21 and outputs a hypothesis to a verification module 27.

In accordance with the present teachings, verification is effected using a novel fully Hierarchical Adaptive Region Model Matching (CHARMM) algorithm. Detail regarding target internal structure is provided to the verification module 27 using data from a target model database 23. Each of the modules may be implemented in hardware or in software without departing from the scope of the present teachings.

Prediction:

In the illustrative embodiment, the Prediction module is implemented using software based on standard computer graphics techniques. Given a target model from the Target Model Database, the Prediction module renders the appearance of the target at the hypothesized location and orientation, as viewed in the sensor's imaging plane. Silhouette predictions are generated from the outer boundary of the rendered target area. Internal structure predictions are derived from the mapping of target components onto image pixels.

Detection:

In the illustrative embodiment, the detection module 15 executes a Triple Gated Filter (TGF) algorithm (also referred to herein as the "Blob Finder"). The Blob Finder algorithm was designed to search for military targets within an IR image. This algorithm relies on target-to-background contrast to make detection decisions. It exploits the differences in mean temperature, measured as differences in mean gray level, between image objects and their background. Images are first convolved with a triple-gated filter. The resulting filtered image, is then searched iteratively for local extrema, which correspond to detections.

The goal of the Blob Finder is to detect targets by searching for objects hotter or colder than their background. In a grayscale infrared image, the temperature of an object is represented as a gray level between black and white. Thus, the Blob Finder computes the mean gray levels of object and background pixels over specific regions of an image.

The Blob Finder divides each image into target and background windows. The target window is a rectangle encompassing an entire target, and the background window is larger, enclosing a piece of the background. This is depicted in FIGS. 2a and 2b.

Figure 2A:
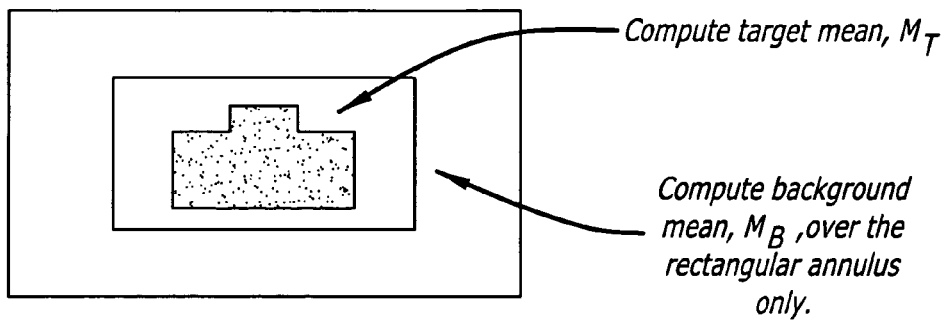
FIG. 2a is a simplified diagram of a front (upper) view of an object detected by the blob finder algorithm.

FIG. 2a is a simplified diagram of a front (upper) view of an object detected by the blob finder algorithm.

Figure 2B:
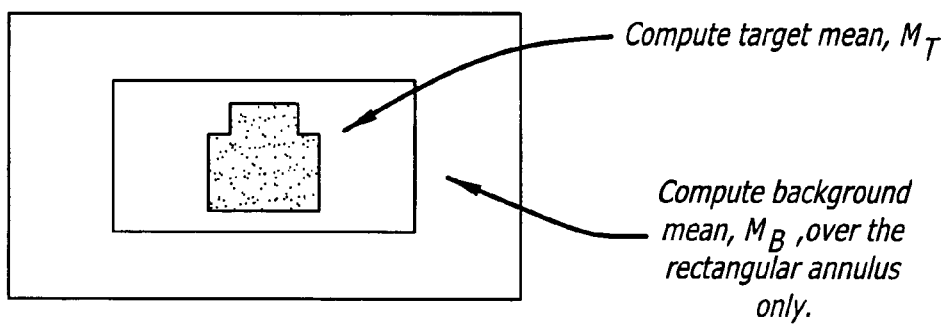
FIG. 2b is a simplified diagram of a side (lower) view of an object detected by the blob finder algorithm.

FIG. 2b is a simplified diagram of a side (lower) view of an object detected by the blob finder algorithm.

Figure 3A:
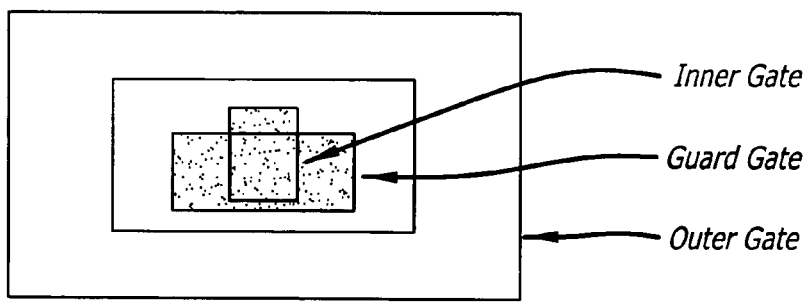
FIG. 3a is a simplified diagram of a front (upper) view of an object detected by the triple gated filter algorithm.

FIG. 3a is a simplified diagram of a front (upper) view of an object detected by the triple gated filter algorithm.

Figure 3B:
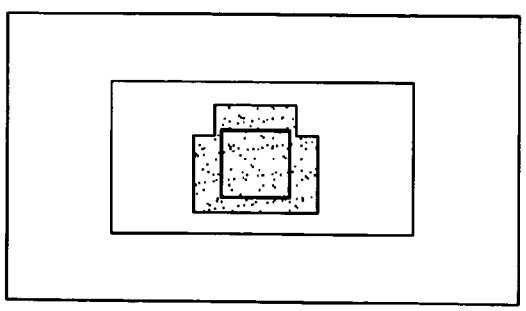
FIG. 3b is a simplified diagram of a side (lower) view of an object detected by the triple gated filter algorithm.

FIG. 3b is a simplified diagram of a side (lower) view of an object detected by the triple gated filter algorithm. The TGF filter provides an inner gate, a guard gate and an outer gate. The inner gate is defined to fit within the target, just inside of the smallest anticipated target view or critical feature. A guard gate is defined to be just bigger than the largest anticipated target dimension. The outer gate is large enough to capture a significant sample of the local background, but not too much. The target mean is computed over the entire inner gate, and the background mean is computed over the area between the guard gate and the outer gate. These restrictions ensure that the target mean is calculated using target pixels only, and that the background mean is calculated using background pixels only. The filter response may be determined using knowledge of the relative image contrast. For example, if the targets are known to be hotter than the background, then a useful filter response would be the difference between the target and background temperatures. If, however, the targets are known to be cooler than the background, then the response would be the negative of that difference. When the target to background contrast polarity is unknown, the absolute value of the difference should be used. This filtering method is similar to a matched filter; when filtering an input image, the filter will give the greatest response where the relative image contrast (input signal) is greatest and the least response where the relative image contrast is least.

Figure 4C:
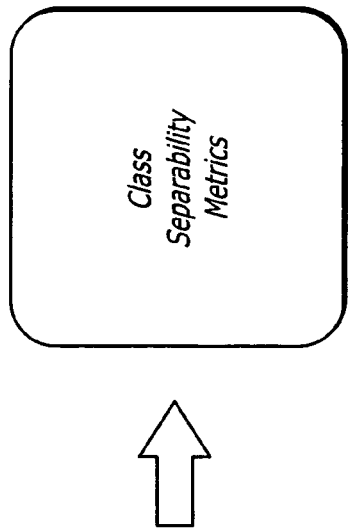
FIG. 4c is a block that represents that gray level information may be used to develop class separability metrics for identification of target pixels.
Figure 4B:
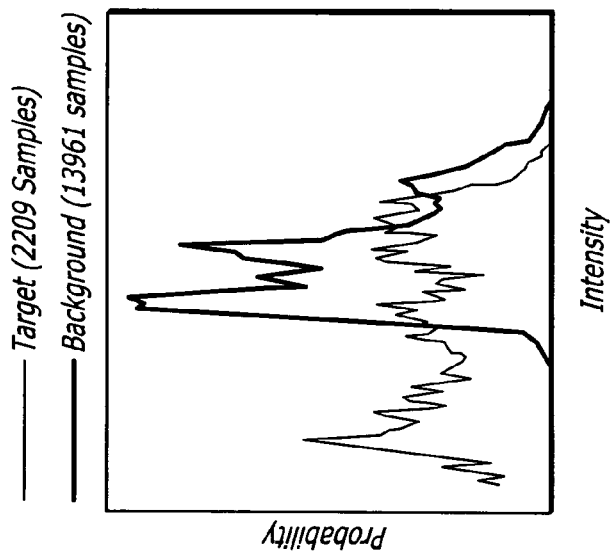
FIG. 4b is a Histogram describing the distribution of gray levels within the target and its background based on information from the triple gated filter.
Figure 4A:
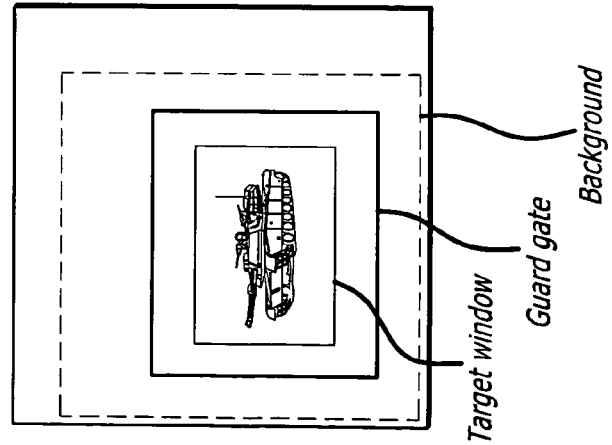
FIG. 4a shows a section of an infrared image with a target, target window, guard gate and background.

FIG. 4*a-c* are diagrams that illustrate the use of a triple-gated filter in a real IR image.

FIG. 4*a* shows a section of an infrared image with a target, target window, guard gate and background.

FIG. 4*b* is a Histogram describing the distribution of gray levels within the target and its background based on information from the triple gated filter. Mean gray levels and other information may be computed from these histograms.

FIG. 4*c* is a block that represents that gray level information may be used to develop class separability metrics for identification of target pixels.

Figure 5:
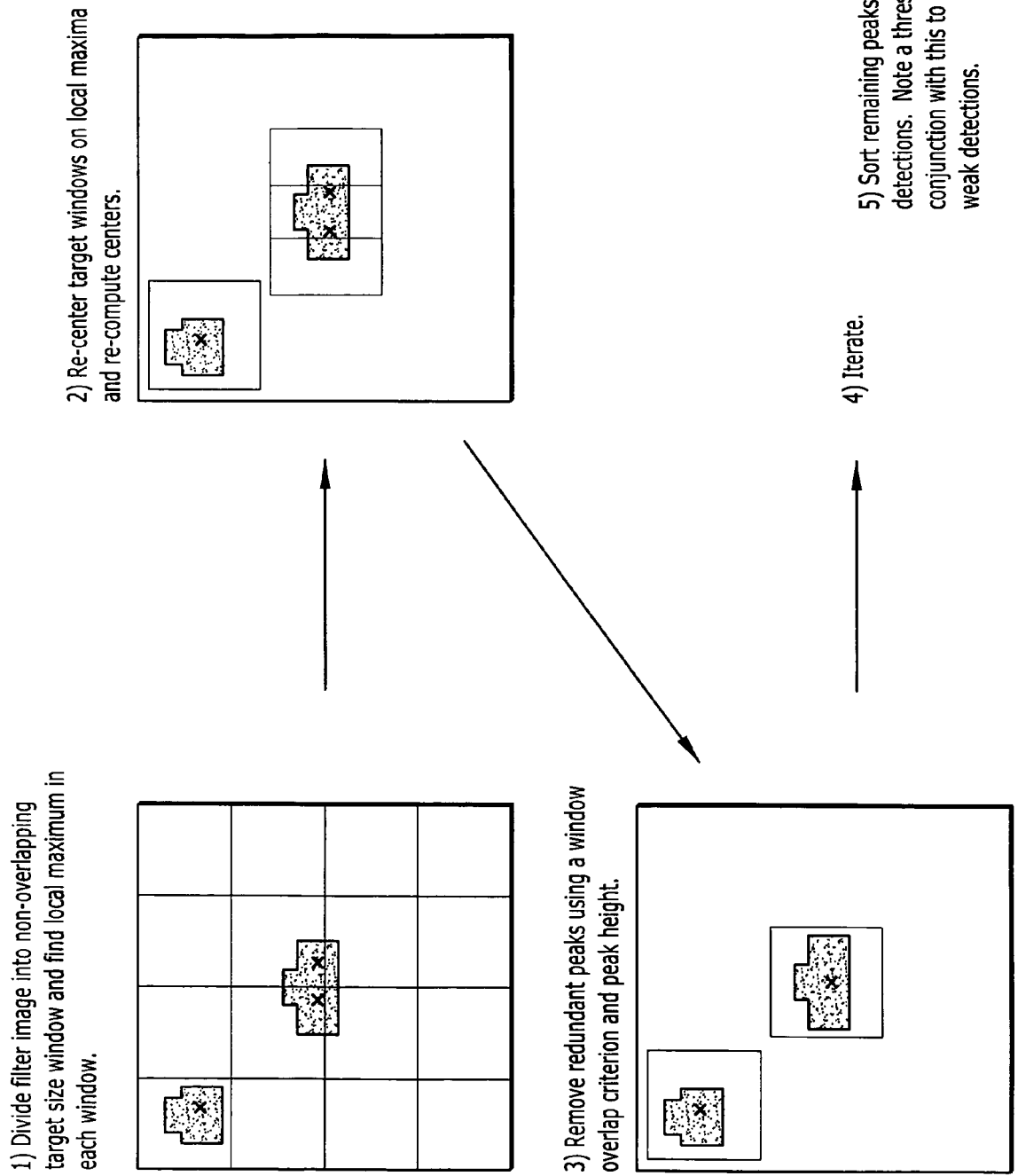
FIG. 5 are a series of diagrams, which show the Blob Finder's iterative process for detecting targets in a triple gated filtered image.
Figure 6:
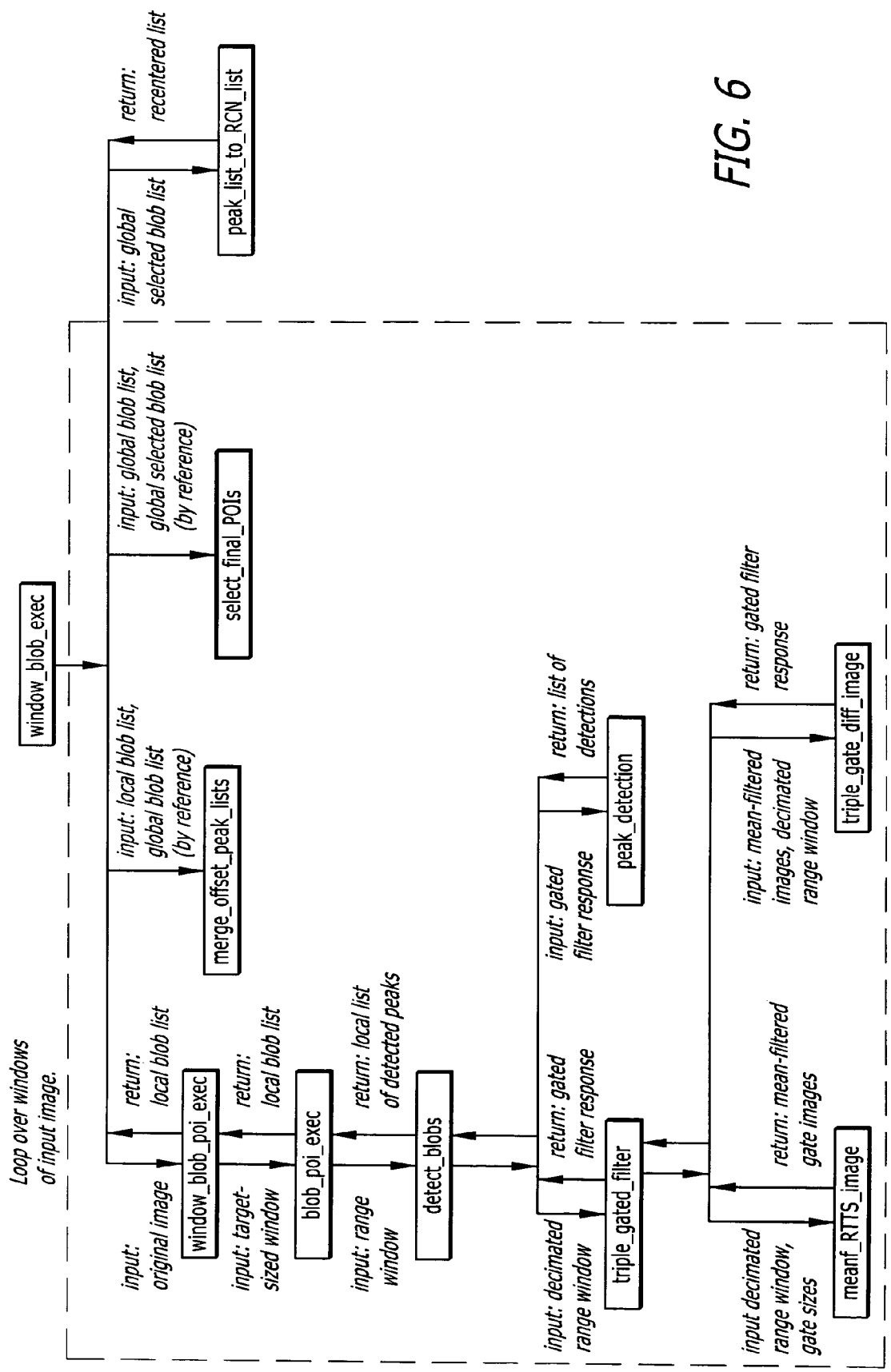
FIG. 6 is a flow diagram of an illustrative implementation of the Blob Finder algorithm.

FIGS. 5 and 6 are diagrams illustrative of the blob finder algorithm. FIG. 5 are a series of diagrams that show the Blob Finder's iterative process for detecting targets in a triple gated filtered image.

FIG. 6 is a flow diagram of an illustrative implementation of the Blob Finder algorithm. As illustrated in FIGS. 5 and 6, the Blob Finder algorithm uses the following method to locate targets in the filtered image. First, the filtered image is divided into non-overlapping target-sized windows, and the local maximum within each window is found. The target windows are then re-centered on pixels of local maxima and the true centers of all windows are re-computed. Redundant peaks are removed using a window overlap criterion and the height of each peak. The algorithm is repeated for a pre-defined number of iterations. The filtered-image peaks are sorted and the top N peaks are taken to be detections. A threshold may be chosen in the pre-processing step to eliminate any obviously weak detections.

Returning to FIG. 1*b*, the detection module 15 outputs region of interest data to an indexing module 17 with respect to potential targets.

Indexing:

The role of the indexing module 17 is to generate an initial set of hypotheses regarding the content of regions of interest (ROIs) found at the detection stage. In the illustrative implementation, a Hausdorff Silhouette Matcher (HSM) was used for this purpose. The HSM algorithm compares edges extracted from measured imagery to synthetic target/background silhouettes generated by the prediction module 23. HSM is a technique that does not rely specifically on the emissive character of LWIR imagery, for which it was originally designed. The HSM algorithm is disclosed more fully below.

Model based target recognition can be viewed as a process of successively refining a space of target type x pose hypothesis until only one hypothesis remains. HSM provides a bridge between a coarse-grained target location process and higher-level model matching based on image structure prediction and multi-function and multi-sensor fusion. HSM performs a refinement function using purely geometrical matching operations.

The core of HSM is the use of Generalized Hausdorff Distance for point pattern matching. Generalized Hausdorff Distance is a robust extension of the standard Hausdorff Distance that does not require comparisons between complete sets of point patterns. In addition, when used for pose estimation, it allows a mathematically rigorous heuristic that provides the same result as would be obtained by exhaustive search of hypothesis space without the actually performing the search.

Hausdorff Distance compares two point sets by finding their largest between set nearest neighbor distances. Thus, the sets are compared by their single greatest dis-similarity. For two sets of points A and B, this can be expressed as:

$$H(A,B)=\max(h(A,B), h(B,A))$$

where:

$$H(A,B)=\max(\min(\|a-b\|))$$

$$a \in A\ b \in B$$

with the inner terms being the set of nearest neighbor distance from A to B. In practice, the term $\min(\|a-b\|)$ is rasterized and replaced by a distance transform image, dist[x,y], whose pixels values at point (x,y) are the distances to the nearest point in set B.

However, this distance does not provide a robust method for comparing point sets in nature where they can be corrupted by the addition of noise like points (e.g. clutter). Thus, Generalized Hausdorff Distance replaces h(A,B) with $h^f$(A,B), the f'th percentile nearest neighbor distance from A to B, with 'f' being the Hausdorff Fraction. Use of this measure, $H^f$(A,B), then allows distance comparisons to be made robustly in the presence of spurious points by ignoring the large nearest neighbor distances.

$H^f$(A,B) can be used to determine the relative location that best aligns two sets of points. The basic process operates by centering one point set, A, at a hypothesized best location, computing $H^f$(A,B), and comparing it to a predefined threshold. The set of all locations for which the threshold test is satisfied then defines a best location set. A best single location can be selected by finding the location with the smallest $H^f$(A,B) value for a fixed 'f'. Alternatively. Hausdorff Distance, H, can be set to a fixed value and the best location is found by maximizing the Hausdorff Fraction 'f'.

Location search can be implemented very efficiently using a property of Hausdorff Distance discovered by William Rucklidge. (See U.S. Pat. No. 5,999,653, entitled FAST TECHNIQUES FOR SEARCHING IMAGES USING THE HAUSDORFF DISTANCE issued Dec. 7, 1999 to Rucklidge, et al.) If some set A is centered on location (x,y), and if $H^f$(A,B) for A at (x,y) exceeds the desired Hausdorff Distance Threshold, then all of the points within a circle can be removed from further consideration by the location process. The radius of this circle is the difference between $H^f$(A,B) for A at (x,y) and the Hausdorff Distance Threshold. This same principle has been extended to rotation, scale, and planar affine transformations. In addition, since Hausdorff Distance is a metric (satisfies the Triangle Inequality) it can be used to define an efficient tree search process over point sets that have been hierarchically clustered.

Hausdorff Silhouette Matching Algorithm Description

The following discussion reviews the major functional elements of a model-matching algorithm based on the use of Hausdorff distance methods. These functions are: 1) Window Extraction, 2) Edge Detection, 3) Distance Transform, 4) Hausdorff Hypothesis Generation, and 5) Hypothesis Verification. Included are brief written descriptions of these functions and pseudo code fragments for the more novel algorithm components. The format is informal using only the keywords for, all, in, end for, if, else, end if, end, and break. Standard arithmetic and logical operators used are +,−,*,/,=,>,<,==, and !=. Variables are denoted by single words or multiple words connected by "_". Array elements are denoted by appending [ ] to the end of the corresponding array name. Functions use the same naming convention as variables, but with a ( ) appended at the end of the name. Variables are assumed global. Computations will be expressed as equations or in plain English.

Window Extraction

FIG. 7 is a diagram that illustrates the operation of the window extraction function of the Hausdorff algorithm used in the illustrative embodiment of the present invention. The window extraction function defines a bounding box in the image being processed that may contain a target. Each such bounding box or window typically corresponds to a detection or interest point supplied by another algorithm. The key requirement for this function is to define a window that will not clip any portion of a possible target while not being larger than necessary (see FIG. 7). To do this, nominal width and height target dimensions are defined using the largest possible dimensions for the set of targets to be recognized. Then, these dimensions are buffered by twice the estimated uncertainty in target location produced by the preceding detection process. For example, if a standard point of interest detector is used to define possible target locations, then the detected location may be anywhere on a target resulting in a ±50% of a target dimension location uncertainty. The detection window is sized to contain an un-clipped target when the initial target, location may be anywhere on the target. Thus, the window to be processed is buffered by a target dimension in width and height and overall has twice the width and height of a nominal target.

Edge Detection

HSM currently operates by matching target to background edges to target silhouette models. This function extracts those edges by applying a Sobel edge operator to an input window image to produce an edge magnitude image, thresholds the results adaptively, and thins the results of the thresholding operation. It returns a binary image. The Sobel edge magnitude generation and edge thinning processes are standard image processing operations that are well-known in the art.

Edge Thresholding

Numerous methods have been proposed for optimally thresholding an edge magnitude image to find true object edges. The methods used herein based on the assumption that objects are bounded by perfect step edges embedded in uncorrelated Gaussian noise. The resulting threshold is:

$$T = \text{Mean}_{Edge\ Magnitude} + \text{Constant} * \text{Standard Deviation}_{Edge\ Magnitude}$$

where the constant is typically determined by the algorithm tuning process.

Distance Transform

This function applies a Borgefors distance transform algorithm to the binary edge data and returns a distance transform image. This distance transform image serves as a lookup table that defines the distance between any (x,y) pixel location and its nearest edge point. This transform is required by the subsequent Hypothesis Generation and Verification functions.

Transform Sizing

The distance transform image is created so that the largest possible target model, centered on each corner of a box defined by the uncertainty in target location will fit just inside of the transform image. This box is defined with respect to edge image coordinates, and need not be centered on the edge image. The distance transform image is never smaller than the original edge image. This process is illustrated in FIG. 8.

FIG. 8 is a diagram that illustrates a transform sizing process for the Hausdorff Model Matching process of the illustrative embodiment. As illustrated in FIG. 8, the distance transform must contain the largest possible model when centered at the corners of the box defining all possible target locations.

Initialization

Once the image is created, it is initialized by setting all of its pixels to the largest possible pixel to pixel distance for an image of its dimensions. Then, the binary edge image is overlaid onto this image, using an offset that defines the relative location of the edge image with respect to the transform image and all distance transform pixels corresponding to edge locations have their distance values set to 0. This is outlined as follows:

```
initialize_distance_transform( )
    for all (x,y) in distance_transform
        if edge_image[x-xoffset,y-yoffset] != 1
            distance_transform[x,y] = Infinity
        else
            distance_transform[x,y] = 0
        end if
    end for
end
```

Distance Computation

The Borgefors distance transform algorithm uses two pass sequential propagation to estimate the approximate Euclidean distance from any pixel in the image to its nearest edge point.

The first pass proceeds from left to right and top to bottom visiting each pixel location (x,y) in the distance transform image.

FIGS. 9a and 9b are diagrams that illustrate a distance computation process for the Hausdorff Model Matching process of the illustrative embodiment. Pixels above and to the left of (x,y) are used to determine the minimum distance during this pass. This is done by adding the weights, a and b, to their corresponding distance values and taking the overall minimum. The values a and b are selected so that their ratio approximates $\sqrt{2}$. A similar process is applied in a second right to left, bottom to top pass. FIGS. 9A and 9B show neighborhoods and weights for distance propagation. FIG. 9A contains the pattern of weights for the left to right, top to bottom pass and FIG. 9B shows the pattern of weights for the right to left, bottom to top pass. P indicates the pixel value at (x, y) and *s are 'don't care' pixels, not used in a specific pass.

Edge effects can be accounted for in several ways. In this disclosure, it is assumed that the transform is only computed for (x, y) locations defined on a window of the distance transform that is inset by one row on the top and bottom of the transform and one column on the right and left.

The computational process is summarized by pseudo code as shown below.

```
minimum_distance_propagation( )
    for all (x,y) in distance_transform_window scanned left to right,
top to bottom
        distance_transform[x,y] =
            min(distance_transform[x,y],
            distance_transform[x-1,y-1]+a)
        distance_transform[x,y] =
            min(distance_transform[x,y],
            distance_transform[x,y-1]+b)
```

```
            distance_transform[x,y] =
                min(distance_transform[x,y],
                distance_transform[x+1,y−1]+a)
            distance_transform[x,y] =
                min(distance_transform[x,y],
                distance_transform[x−1,y]+b)
        end for
        for all (x,y) in distance_transform_window scanned right to left ,
bottom to top
            distance_transform[x,y] =
                min(distance_transform[x,y],
                distance_transform[x+1,y]+b)
            distance_transform[x,y] =
                min(distance_transform[x,y],
                distance_transform[x−1,y+1]+a)
            distance_transform[x,y] =
                min(distance_transform[x,y],
                distance_transform[x,y+1]+b)
            distance_transform[x,y] =
                min(distance_transform[x,y],
                distance_transform[x+1,y+1+a)
        end for
end
```

Hausdorff Hypothesis Generation

Hausdorff Hypothesis Generation is a top down process that enumerates all hypotheses (model, scale, roll, and location combinations) having an acceptable Hausdorff matching fraction. This process is exploits the methods discussed above to generate hypotheses having the maximum Hausdorff matching fraction for each model, scale factor, and roll angle. A pseudo-code summary for the entire process is shown below.

```
hausdorff_hypothesis_generation( )
    for all models in a model set
        range_scale_factor = model_range/detection_range
        scale_model_points(model, range_scale_factor)
        for all specified scale factors
            scale_model_points( model, scale)
            for all specified roll angles
                roll_model_points(model_points, roll)
                hausdorff_fraction_number    =
hausdorff_location_search( )
                if    hausdorff_fraction_number    >=
threshold_hausdorff_fraction_number
                    record_hypothesis( )
                end if
            end for
        end for
    end for
end
```

Model Scaling and Roll

Models are selected one at a time and subjected to two scalings applied to the (x,y) coordinates comprising a model. Scaling is applied about the model's center to avoid spurious offset generation. The first scaling compensates for differences between model range and pixel spacing and the range and pixel spacing of the data being processed. A second sequence of scale factors is then applied to each model. This sequence accounts for uncertainties in estimated target range. A best match is generated for each scale factor in this sequence.

Each scaled model is then subjected to a sequence of rolls or rotations about its center. Roll can be used to account for uncompensated sensor line of sight roll, unknown terrain tilt, and apparent roll due to finite aspect sampling of models at non zero depression angles. Nonuniform pixel spacing should be accounted for when rotating models although the current algorithm implementation does not do this.

Hausdorff Location Search

This function performs the location matching portion of Hausdorff Hypothesis Generation.

```
hausdorff_location_search( )
    for all y in search_box
        for all x in search_box
            if search_box[y][x] != touched
                compute_distance_histogram( )
                compute_number_matched( )
                if number_matched<= best_number_matched
                    compute_hausdorff_distance( )
                    blanking_radius =
                        hausdorff_distance −
                    hausdorff_distance_threshold
                    blank_circle( )
                else
                    search_box[y][x] = touched
                    best_number_matched = number_matched
                    best_x = x
                    best_y = y
                end if
            end if
        end for
    end for
end
```

It operates by scanning a scaled and rolled model's center over a search box and determining the single search box location that produces the highest Hausdorff fraction value that is greater than the threshold value. Hausdorff fraction is expressed in terms of the number of model points within the Hausdorff distance threshold of an edge point. It also uses Hausdorff distance values to "blank" out circular regions that can not contain a location that satisfies the fractional threshold criterion. Note from the included pseudo code description that this function recursively increases the fraction threshold as it goes.

In this disclosure, it is assumed that all (x, y) values are considered in sequence. In practice, it has been found that by first uniformly sampling (x, y) values, a faster search can be obtained.

Minimum Distance Histogram

This function creates a histogram of distance values for a given model location using the distance transform values at each model point location. Model point locations are offset to account for the relationship between search_box and distance_transform pixels. In practice, this histogram is clipped at an upper value much less than the maximum possible distance_transform value to reduce the amount of time spent re-initializing the histogram for each new model location.

In the following pseudo-code description, models are centered on (x, y) values in the search_box image, with (xmodel, ymodel) being model point locations with respect to a model centered coordinate system, and (xoffset, yoffset) being the location of the upper left hand corner of the search_box in distance transform image coordinates (u, v)

```
compute_distance_histogram( )
    initialize_histogram_to_zero( )
    for all points in a model compute distance transform location
        u = x + xmodel + xoffset
        v = y + ymodel + yoffset
        histogram[ distance_transform[v,u] += 1
    end for
end
```

Compute Hausdorff Distance

This function computes the Hausdorff distance at the current Hausdorff fraction value (expressed in terms of number of model points).

```
compute_hausdorff_distance( )
    hausdorff_distance = 0;
    number_matched = 0;
    for all distances d in histogram
        number_matched += histogram[d]
        if number_matched > hausdorff_fraction_number break
        hausdorff_distance = d
    end for
end
```

Compute Number Matched

This function uses the distance histogram to compute the number of model points within the Hausdorff distance threshold of an edge point.

```
compute_number_matched( )
    number_matched = 0
    for all distances d in histogram
        if d <= hausdorff_distance_threshold
            number_matched += histogram[d]
        end if
    end for
end
```

Blank Circle

Based on the discussion above, this function sets all search_box points with a specified blanking_radius to the value "touched". This indicates that these locations need not be considered further in the search process. Note a square inscribed in this circle may be used as well.

Record Hypothesis

Following Hausdorff Location Search, the final best Hausdorff Fraction is compared to the threshold Hausdorff Fraction to determine if the model, scale, roll, and location hypothesis test should be retained for further processing.

Hypothesis Verification

This function applies computationally expensive operations to produce a more precise model to data match score than provided by the maximum Hausdorff fraction. Depending on the values of the Hausdorff distance and fraction threshold values many models and hypothesized scales, rolls, and locations may match a given set of edge points. This is because the Hausdorff distance test does not discriminate between model points that are far from an edge point as long as they are within the threshold distance. This function seeks to correct this by computing a distance weighted match score.

This match score is computed using a truncated inverse distance measure for each model point. The process defines a weighting function on [0,1] that linearly weights a model point using its distance transform value. Points whose distance transform value have a distance transform of 0 are assigned a weight of 1. Points whose transform value is equal to or greater than a constant, termed k_dt_contsant, are given a weight of zero. These weights are averaged over the set of all model points so that the final score is on [0,1]. The inverse weighting preferentially selects for model points that are close to edge points. The cutoff value at k_dt_constant serves to preserve the outlier elimination characteristic of the Hausdorff distance.

In the following pseudo code description, models are centered on (x, y) values in the search_box image, with (xmodel, ymodel) being model point locations with respect to a model centered coordinate system, and (xoffset, yoffset) being the location of the upper left hand corner of the search_box in distance transform image coordinates (u, v)

```
hypothesis_verification( )
    score = 0
    for all points in a model compute distance transform location
        u = x + xmodel + xoffset
        v = y + ymodel + yoffset
        if distance_transform[v,u] <= k_dt_constant
            weight = 1 – distance_transform[v,u] / k_dt_constant
        else
            weight = 0
        end if
        score += weight
    end for
    score = score / number_of_model_points
end
```

See also the above-referenced U.S. Pat. No. 5,999,653, entitled FAST TECHNIQUES FOR SEARCHING IMAGES USING THE HAUSDORFF DISTANCE issued Dec. 7, 1999 to Rucklidge, et al. the teachings of which are incorporated herein by reference.

Verification:

Returning briefly to FIG. 1b, the indexing module 17 outputs a set of target hypotheses to the verification module 27. In accordance with the present teachings, the verification module executes the Hierarchical Adaptive Region Model Matcher (CHARMM) algorithm referred to above. The CHARMM algorithm generates models to represent observed images of real targets.

Figure 10:
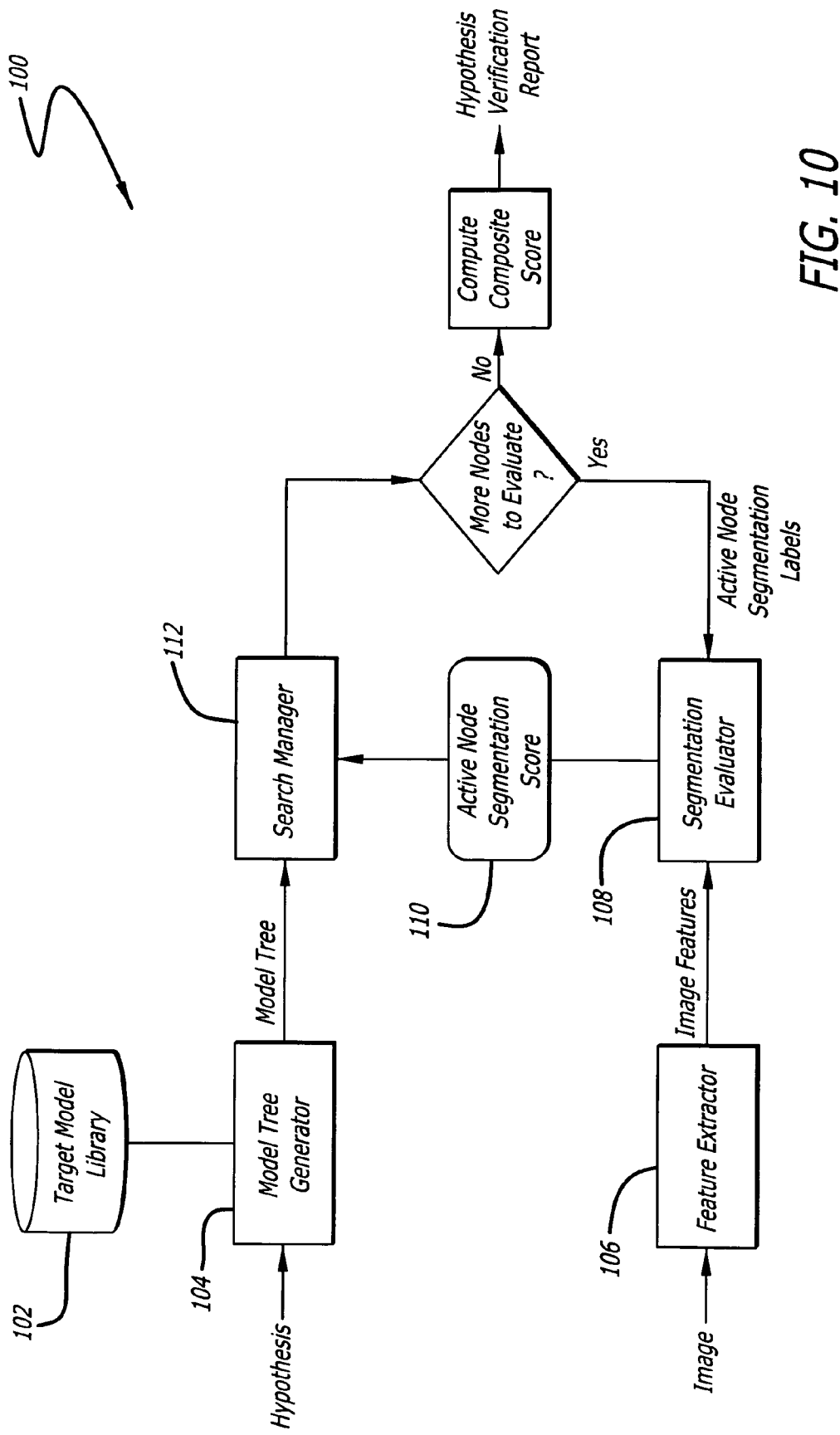
FIG. 10 is a flow diagram of an illustrative embodiment of the hierarchical adaptive region model matcher (CHARMM) verification algorithm of the present invention.

FIG. 10 is a flow diagram of an illustrative embodiment of the CHARMM verification algorithm of the present invention. As shown in FIG. 10, the CHARMM process depends on two inputs: an image collected by a sensor (not shown) and a hypothesis, which contains the type, location, and orientation of a hypothesized target in the image. In the illustrative embodiment, the sensor is an optical sensor. Nonetheless, those skilled in the art will appreciate that the present teachings are not limited thereto.

In any event, CHARMM use a target model library 102 that contains a Computer Aided Design (CAD) model representation of the hypothesized target type. A model tree generator 104 retrieves an appropriate CAD model from the target model library 102 based on the hypothesized target type and renders a model tree from the model that represents the appearance of the hypothesized target at the hypothesized location and orientation. This rendering may be accomplished via standard graphics techniques.

As the term is used herein, a 'model tree' is a data structure that associates each structural component of a given CAD model with the image pixels that it would occupy when the target is viewed at a given location and orientation. Its representation as a tree replicates the structural hierarchy given by the CAD model.

A feature extractor 106 transforms a given image into a set of image features that represent selected salient characteristics of the image. The present invention is not limited to the type or number of features employed. Those skilled in the art will appreciate that the type and number of features employed may be selected on an application-dependent basis. A variety of appropriate image feature types may be found in the public domain. In the best mode, the identity function is used as the feature extractor. That is, the image features are identical to the original measured image. Image features are represented as a multi-channel image, each channel of which has the same array size as the original image from which it was computed.

Active node segmentation labels are represented as an integer-valued image that describes the partition of a region into a set of sub-regions. The integer pixel values used have no intrinsic significance, but function only as labels. In the illustrative embodiment, one special value (nominally 0) is used to label pixels that fall outside of the region of interest. Any other allowed value may be used to label the groups of pixels that fall into each of subregions within the region of interest.

A segmentation evaluator 108 tests the quality of a specified set of segmentation labels based on a supplied set of image features. Its output is a numerical score; its value is to be positive if the proposed segmentation is deemed to be beneficial and negative otherwise. The specific segmentation criteria employed for this purpose are not limited by the present teachings and may be selected on an application-dependent or feature-dependent basis. A variety of appropriate segmentation criteria may be found in the public domain. In the best mode, the segmentation evaluator uses a segmentation criterion based on the Minimum Description Length (MDL) principle. The MDL may be calculated as shown below:

$$MDL(\text{``segmented image''}) = $$
$$k\log n + \frac{1}{2}\log(3)\sum_{j=1}^{k} b_j + \frac{1}{2}\sum_{j=1}^{k} \log a_j + \frac{n}{2}\log\left(\frac{RSS}{n}\right)$$

where k=number of regions in the predicted image model;
n=total number of pixels;
$a_j$=area of the $j^{th}$ region;
$b_j$=number of boundary points in the jth region; and
RSS=residual sum of squared differences between model and data.

Note that the expression $$k\log n + \frac{1}{2}\log(3)\sum_{j=1}^{k} b_j + \frac{1}{2}\sum_{j=1}^{k} \log a_j$$

represents the properties of image segmentation and $$\frac{n}{2}\log\left(\frac{RSS}{n}\right)$$

is a measure of the 'goodness' of model/data fit.

A search manager 112 directs the traversal of the model tree and generates proposed segmentations for evaluation.

Figure 11:
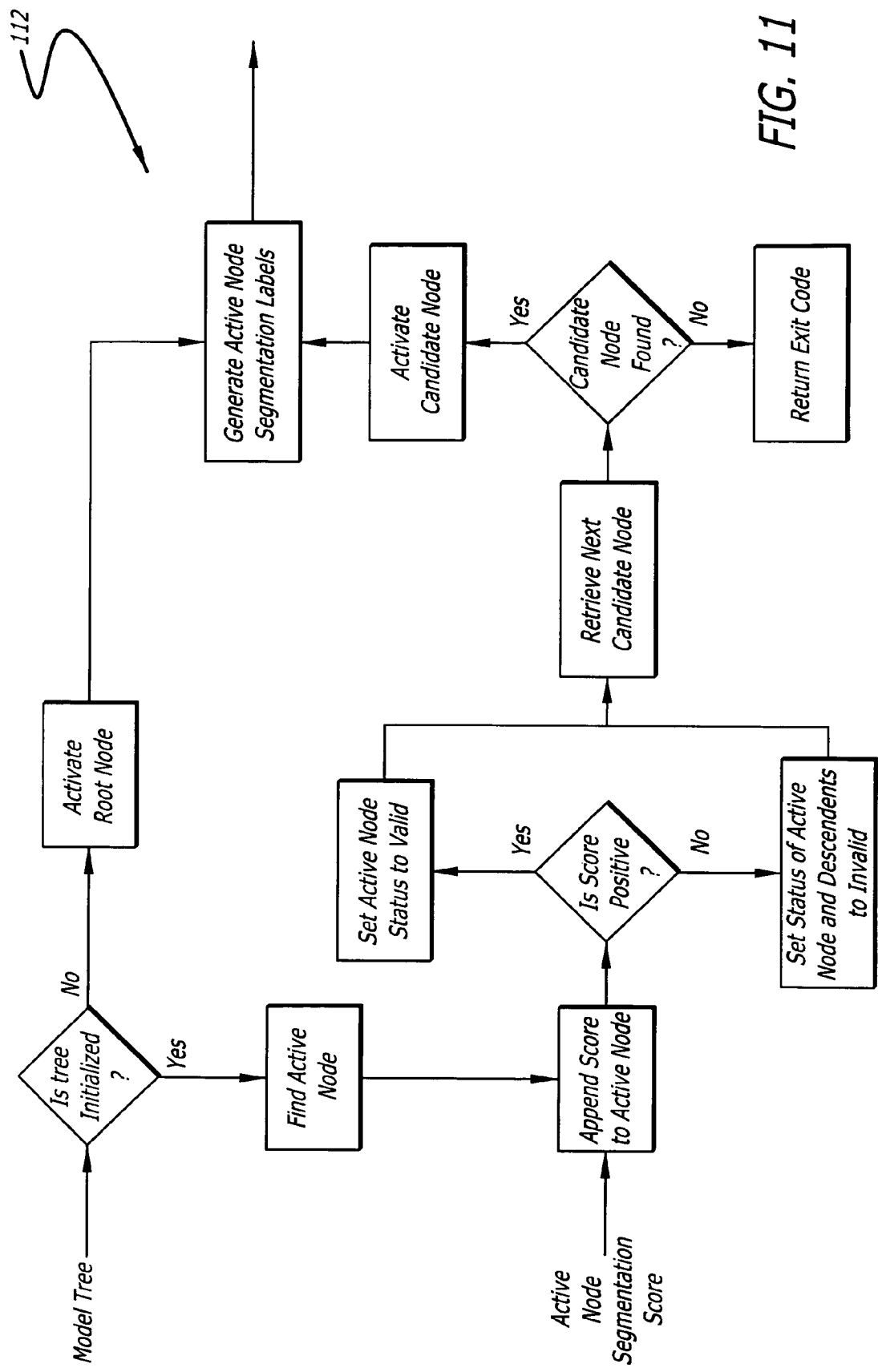
FIG. 11 is a diagram that shows an illustrative implementation of the search manager in greater detail.

FIG. 11 is a diagram that shows an illustrative implementation of the search manager in greater detail. As shown in FIG. 11, the search manager 112 uses a modified breadth-first tree traversal method. On the first iteration, the model tree is initialized by setting its root node to active status. On subsequent iterations, the current active node is updated with the segmentation score computed for it by the segmentation evaluator 108 and its status is changed to valid or invalid, depending on whether the score is positive or negative. In the latter case, all descendants of the node are also declared invalid. Then the tree is searched from the current node in a breadth-first manner for the next candidate node, defined to be the first non-leaf node encountered whose status is not set to invalid. If no such candidate node is found, the search manager returns a code signifying that no further segmentation tests are required. If a candidate node is found, its status is set to active. Once an active node is identified, a corresponding set of segmentation labels is generated.

Figure 12:
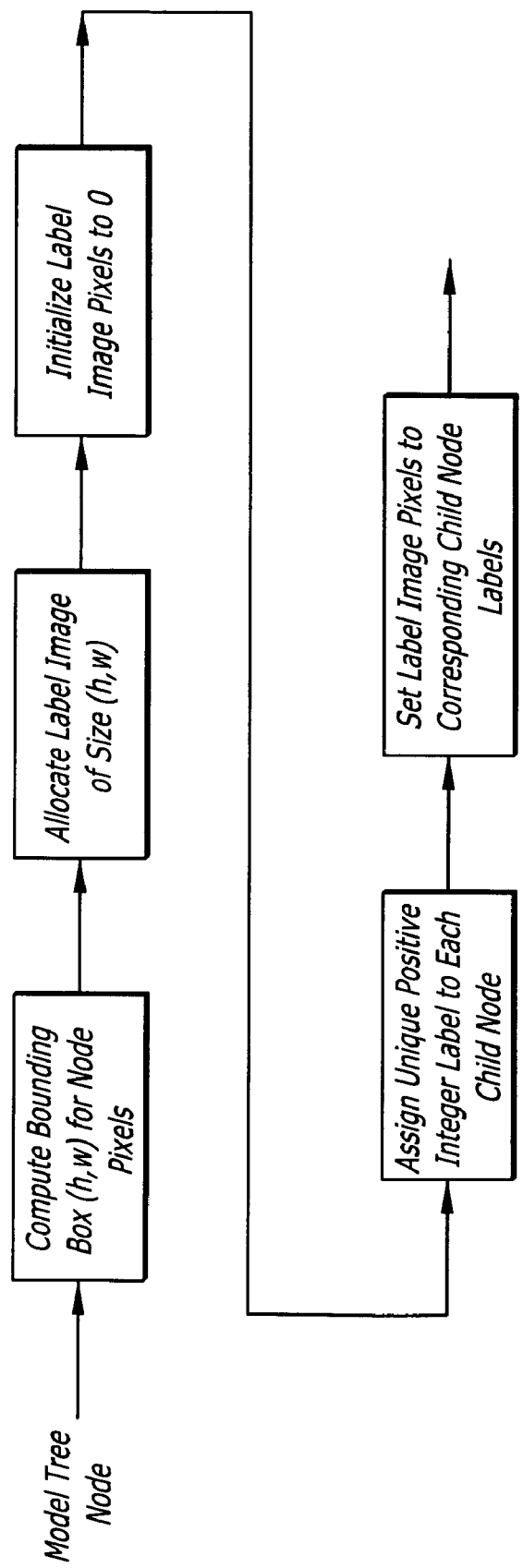
FIG. 12 is a flow diagram showing the step of generating active node segmentation labels of FIG. 11 in more detail.

FIG. 12 is a flow diagram showing the step of generating active node segmentation labels of FIG. 11 in more detail. As shown in FIG. 12, the first step in this process is to determine the size of the minimum rectangular bounding box that contains the region occupied by the active node. Then a label image of that size is allocated and initialized to the value 0. Unique labels are assigned to each child of the active node, and then the value of each pixel is set to the label of the child node that occupies it.

When no nodes remain for evaluation, a final stage of processing computes a composite score by summing the segmentation scores assigned to valid nodes on the model tree. Then a hypothesis verification report, which assigns this composite score to the current hypothesis, is returned.

Hence, it is evident from the above that some of the features of CHARMM are:

1. Target signature predictions are based solely on geometry, not phenomenology. There is no attempt to predict or identify the specific phenomenological effects responsible for image characteristics. This makes for an extremely versatile and general approach, eliminates risks due to inaccurate image modeling, substantially reduces the impact of unknowable environmental parameters, and decreases throughput and memory requirements.
2. The match optimization process flow is directed by the target model's structure hierarchy.
3. The objective function is computed from local constrained image segmentation metrics.
4. The method is highly adaptive to scene characteristics without sacrificing discriminatory power. For each target hypothesis, a sequence of image models is investigated, progressing systematically from simple to complex.

At each stage, the decision whether to proceed to the next level of complexity is made via local data-driven operations, meaning that the algorithm automatically focuses attention on regions that contain useful detail while ignoring those that do not. This process is always constrained by the geometry of the target model, so that progress down the complexity hierarchy is not vacuous, but implies increasing evidence for the corresponding target hypothesis.

5. The modularity of the design disentangles hypothesis management and match optimization from the definition of the objective function. The clean interface allows many different segmentation criteria to be used, in deciding whether to decompose a given node in the model hierarchy. In the illustrative embodiment, a Minimum Description Length metric that models image regions with uniform grayscales was used. However, this metric could readily be substituted by or supplemented with others based on texture, edge shape, statistical characteristics, spectral properties, or essentially any other measure used for image segmentation.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A target recognition system comprising:
   first means for receiving an image of a scene within which a target may be included;
   second means for using constrained image segmentation as a basis for recognition of the target in the scene, the second means including means for implementing a hierarchical adaptive region model matcher for generating a representation of the target in the scene; and
   a display device for displaying the representation of the target in the scene.

2. The system of claim 1 wherein the first means includes means for providing target hypotheses.

3. The system of claim 1 wherein the segmentation is variable and derived from a geometry model.

4. The system of claim 1 wherein the means for using constrained image segmentation includes means for using target geometry models to derive alternative image segmentations.

5. The system of claim 1 wherein the first means includes a detection module.

6. The system of claim 5 wherein the detection module executes a triple gated filter.

7. The system of claim 1 wherein the second means includes an indexing module.

8. The system of claim 7 wherein the indexing module includes a Hausdorff Silhouette Matcher.

9. The system of claim 1 wherein the second means includes a verification module.

10. The system of claim 1 wherein the means for implementing a hierarchical adaptive region model matcher includes means for receiving an image and a hypothesis with respect to a target in the image.

11. The system of claim 10 wherein the hypothesis contains type, location, and/or orientation of a hypothesized target in the image.

12. The system of claim 10 wherein the means for receiving a hypothesis includes a model tree generator.

13. The system of claim 12 further including a target model library.

14. The system of claim 13 wherein the library has a plurality of computer generated target models stored therein.

15. The system of claim 13 wherein the model tree generator includes means for retrieving a model from the library based on a hypothesized target type.

16. The system of claim 15 wherein the retrieved model is based on the hypothesis.

17. The system of claim 16 wherein the model tree generator includes means for rendering a model tree from the retrieved model that represents the appearance of a hypothesized target at a hypothesized location.

18. The system of claim 17 wherein the model tree generator includes means for rendering a model tree from the retrieved model that represents the appearance of a hypothesized target at a hypothesized orientation.

19. The system of claim 12 wherein the means for implementing a hierarchical adaptive region model matcher includes a search manager adapted to receive a model tree from the model tree generator.

20. The system of claim 19 wherein the means for receiving an image includes a feature extractor.

21. The system of claim 20 wherein the means for implementing a hierarchical adaptive region model matcher includes a segmentation evaluator coupled to receive image features from the feature extractor.

22. The system of claim 21 wherein the segmentation evaluator includes means for outputting a segmentation score to the search manager with respect to a specified set of segmentation labels based on a supplied set of image features for an active node.

23. The system of claim 22 wherein the segmentation evaluator includes means for using a segmentation criterion based on the Minimum Description Length (MDL) principle.

24. The system of claim 1 wherein the hierarchical adaptive region model matcher includes means for adding or removing a component to a model and comparing a resulting metric to a current metric to effect target recognition.

25. A target recognition system comprising:
   a detection module for providing an image of a scene within which a target may be included;
   an indexing module for generating a plurality of hypotheses with respect to a potential target in the scene;
   a verification module for using constrained image segmentation as a basis for target recognition, wherein the verification module includes a hierarchical adaptive region model matcher for generating a representation of the target in the scene; and
   a display device for displaying the representation of the target in the scene.

26. The system of claim 25 wherein the hierarchical adaptive region model matcher includes means for receiving an image and a hypothesis with respect to a target in the image.

27. The system of claim 26 wherein the hypothesis contains type, location, and/or orientation of a hypothesized target in the image.

28. The system of claim 26 wherein the means for receiving a hypothesis includes a model tree generator.

29. The system of claim 28 further including a target model library.

30. The system of claim 29 wherein the library has a plurality of computer generated target models stored therein.

31. The system of claim 29 wherein the model tree generator includes means for retrieving a model from the library based on a hypothesized target type.

32. The system of claim 31 wherein the model tree generator includes means for rendering a model tree from the retrieved model that represents the appearance of a hypothesized target at a hypothesized location.

33. The system of claim 32 wherein the model tree generator includes means for rendering a model tree from the retrieved model that represents the appearance of a hypothesized target at a hypothesized orientation.

34. The system of claim 28 wherein the means for implementing a hierarchical adaptive region model matcher includes a search manager adapted to receive a model tree from the model tree generator.

35. The system of claim 34 wherein the means for receiving an image includes a feature extractor.

36. The system of claim 35 wherein the means for implementing a hierarchical adaptive region model matcher includes a segmentation evaluator coupled to receive image features from the feature extractor.

37. The system of claim 36 wherein the segmentation evaluator includes means for outputting a segmentation score to the search manager with respect to a specified set of segmentation labels based on a supplied set of image features for an active node.

38. The system of claim 37 wherein the segmentation evaluator includes means for using a segmentation criterion based on the Minimum Description Length (MDL) principle.

39. The system of claim 37 wherein the model tree generator includes means for rendering a model tree from the retrieved model that represents the appearance of a hypothesized target at a hypothesized orientation.

40. The system of claim 28 wherein the means for implementing a hierarchical adaptive region model matcher includes a search manager adapted to receive a model tree from the model tree generator.

41. The system of claim 40 wherein the means for receiving an image includes a feature extractor.

42. The system of claim 41 wherein the means for implementing a hierarchical adaptive region model matcher includes a segmentation evaluator coupled to receive image features from the feature extractor.

43. A target recognition method including:
receiving by a processor an image of a scene within which a target may be included;
providing a target hypothesis; and
verifying the target hypothesis by the processor, the verifying including implementing a hierarchical adaptive region model matcher for generating a representation of the target in the scene based on the target hypothesis.

44. The method of claim 43 wherein the implementing a hierarchical adaptive region model matcher includes receiving an image and the hypothesis with respect to a target in the image.

45. The method of claim 44 wherein the hypothesis contains type, location, and/or orientation of a hypothesized target in the image.

46. The method of claim 44 wherein the receiving a hypothesis includes receiving the hypothesis by a model tree generator.

47. The method of claim 46 further including accessing a target model library.

48. The method of claim 47 wherein the library has a plurality of computer generated target models stored therein.

49. The method of claim 47 further comprising retrieving a model from the library based on a hypothesized target type.

50. The method of claim 49 wherein the retrieved model is based on the hypothesis.

51. The method of claim 50 further comprising rendering a model tree from the retrieved model that represents the appearance of a hypothesized target at a hypothesized location.

52. The method of claim 51 further comprising rendering a model tree from the retrieved model that represents the appearance of a hypothesized target at a hypothesized orientation.

53. The method of claim 46 wherein implementing a hierarchical adaptive region model matcher includes receiving by a search manager a model tree from the model tree generator.

54. The method of claim 53 wherein receiving an image includes receiving image features from a feature extractor.

55. The method of claim 54 wherein implementing a hierarchical adaptive region model matcher includes receiving by a segmentation evaluator the image features from the feature extractor.

56. The method of claim 55 further comprising outputting a segmentation score to the search manager with respect to a specified set of segmentation labels based on a supplied set of image features for an active node.

57. The method of claim 55 further comprising using a segmentation criterion based on the Minimum Description Length (MDL) principle.

58. A target recognition system comprising:
a processor configured to:
receive an image of a scene including a target object;
receive a hypothesis for the target object in the image;
retrieve a geometry model from a library based on the hypothesis for the target object; and
generate a representation of the target object based on the retrieved geometry model and the hypothesis, wherein the generating includes:
traversing a model tree and generating proposed image segmentations based on a segmentation criteria, the model tree having a plurality of nodes;
extracting image features from the received image;
evaluating the proposed image segmentations based on the extracted image features, the evaluating including assigning scores to nodes of the model tree associated with the proposed image segmentations, based on the extracted image features; and
generating a composite score for the hypothesis based on the assigned scores; and
a display device coupled to the processor for displaying the generated representation of the target object.

59. The system of claim 58, wherein the hypothesis includes a hypothesized location and orientation of the target object.

60. The system of claim 59, wherein generating the representation of the target object further includes rendering the model tree representing the appearance of the target object at the hypothesized location and orientation.

61. The system of claim 58, wherein the processor is further configured to update a status of the nodes of the model tree as valid or invalid based on the assigned scores, wherein the updating of the status of a current node as invalid automatically updates the status of all descendants of the current node as invalid.

* * * * *